(12) United States Patent
Duan et al.

(10) Patent No.: US 12,093,659 B2
(45) Date of Patent: Sep. 17, 2024

(54) TEXT GENERATION WITH CUSTOMIZABLE STYLE

(71) Applicant: Microsoft Technology Licensing, LLC, Redmond, WA (US)

(72) Inventors: Nan Duan, Beijing (CN); Ming Zhou, Beijing (CN); Yaobo Liang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 526 days.

(21) Appl. No.: 17/291,772

(22) PCT Filed: Dec. 6, 2019

(86) PCT No.: PCT/US2019/064801
§ 371 (c)(1),
(2) Date: May 6, 2021

(87) PCT Pub. No.: WO2020/139536
PCT Pub. Date: Jul. 2, 2020

(65) Prior Publication Data
US 2022/0027577 A1 Jan. 27, 2022

(30) Foreign Application Priority Data
Dec. 24, 2018 (CN) .......................... 201811585240.7

(51) Int. Cl.
*G06F 40/42* (2020.01)
*G06F 40/30* (2020.01)

(52) U.S. Cl.
CPC .............. *G06F 40/42* (2020.01); *G06F 40/30* (2020.01)

(58) Field of Classification Search
CPC .................................. G06F 40/42; G06F 40/30
See application file for complete search history.

(56) References Cited

U.S. PATENT DOCUMENTS 7,886,012 B2 2/2011 Bedi et al.
9,560,152 B1 1/2017 Jamdar et al.
(Continued)

FOREIGN PATENT DOCUMENTS

CN 107341171 A 11/2017
CN 108427665 A 8/2018
(Continued)

OTHER PUBLICATIONS

"Second Office Action Issued in Chinese Patent Application No. 201811585240.7", Mailed Date: Aug. 1, 2023, 10 Pages.
(Continued)

*Primary Examiner* — Daniel C Washburn
*Assistant Examiner* — Athar N Pasha
(74) *Attorney, Agent, or Firm* — Schwegman Lundberg & Woessner, P.A.

(57) ABSTRACT

Implementations of the present disclosure relate to text generation with a customizable style. In a method, a first natural language is received; the first natural language text is converted, via a text generation model, into a second natural language text that at least partly reflects the meaning of the first natural language text and has a style distinguishable from the first natural language text, the text generation model comprising a modifiable parameter; and in response to receiving a modification to the parameter, the first natural language text is converted, via the text generation model, into a third natural language text that at least partly reflects the meaning of the first natural language text and includes a style distinguishable from both the first natural language text and the second natural language text.

13 Claims, 5 Drawing Sheets

(56) References Cited

U.S. PATENT DOCUMENTS

| | | | |
|---|---|---|---|
| 10,594,757 B1* | 3/2020 | Shevchenko | G06F 40/253 |
| 11,367,117 B1* | 6/2022 | Cheng | G06F 40/30 |
| 2004/0153309 A1 | 8/2004 | Lin et al. | |
| 2005/0234700 A1 | 10/2005 | Li et al. | |
| 2012/0136939 A1 | 5/2012 | Stern et al. | |
| 2012/0197630 A1 | 8/2012 | Lyons et al. | |
| 2014/0195897 A1 | 7/2014 | Balinsky et al. | |
| 2016/0034512 A1 | 2/2016 | Singhal et al. | |
| 2016/0180215 A1 | 6/2016 | Vinyals et al. | |
| 2016/0328383 A1 | 11/2016 | Cross et al. | |
| 2019/0325068 A1* | 10/2019 | Lai | G06F 16/951 |
| 2019/0384810 A1* | 12/2019 | Huang | G06F 40/56 |
| 2021/0042472 A1* | 2/2021 | Nishida | G06N 3/044 |
| 2021/0287657 A1* | 9/2021 | Deng | G06F 40/30 |

FOREIGN PATENT DOCUMENTS

| | | |
|---|---|---|
| CN | 108519890 A | 9/2018 |
| WO | 2005048120 A1 | 5/2005 |

OTHER PUBLICATIONS

"First Office Action and Search Report Issued in Chinese Patent Application No. 201811585240.7", Mailed Date: Mar. 18, 2023, 15 Pages.

Abadi, et al., "Tensorflow: A System for Large-Scale Machine Learning", In Proceedings of 12th USENIX Symposium on Operating Systems Design and Implementation, Nov. 2, 2016, pp. 265-283.

Bahdanau, et al., "Neural Machine Translation by Jointly Learning to Align and Translate", In Proceeding of International Conference on Learning Representations, May 7, 2015, pp. 1-15.

Bowman, et al., "Generating Sentences from a Continuous Space", In Proceedings of the 20th SIGNLL Conference on Computational Natural Language Learning, Aug. 7, 2016, pp. 10-21.

Cho, et al., "Learning Phrase Representations using RNN Encoder-Decoder for Statistical Machine Translation", In Proceedings of Conference on Empirical Methods in Natural Language Processing, Oct. 25, 2014, pp. 1724-1734.

Cho, et al., "On the Properties of Neural Machine Translation: Encoder—Decoder Approaches", In Proceedings of Eighth Workshop on Syntax, Semantics and Structure in Statistical Translation, Oct. 25, 2014, pp. 103-111.

Gehring, et al., "Convolutional sequence to sequence learning", In Proceedings of the 34th International Conference on Machine Learning, Aug. 6, 2017, 10 Pages.

Gu, et al., "Incorporating Copying Mechanism in Sequence-to-Sequence Learning", In Proceedings of the 54th Annual Meeting of the Association for Computational Linguistics, vol. 1, Aug. 7, 2016, pp. 1631-1640.

Gulcehre, et al., "Plan, Attend, Generate: Planning for Sequence-to-Sequence Models", In Proceedings of the 31st International Conference on Neural Information Processing Systems, Dec. 4, 2017, pp. 1-10.

Gupta, et al., "A Deep Generative Framework for Paraphrase Generation", In Proceedings of the AAAI Conference on Artificial Intelligence, Apr. 27, 2018, pp. 5149-5156.

He, et al., "Decoding with Value Networks for Neural Machine Translation", In Proceedings of Advances in Neural Information Processing Systems, Dec. 4, 2017, pp. pp. 1-10.

Kingma, et al., "Adam: A Method for Stochastic Optimization", In Proceedings of the International Conference on Learning Representations, May 7, 2015, 13 Pages.

Koehn, Phillip, "Pharaoh: A Beam Search Decoder for Phrase-Based Statistical Machine Translation Models", In Proceedings of Conference of the Association for Machine Translation in the Americas, Sep. 28, 2004, pp. 1-10.

Lecun, et al., "Deep learning", In Journal of Nature, vol. 521, Issue 7553, May 28, 2015, pp. 436-444.

Li, et al., "Paraphrase Generation with Deep Reinforcement Learning", In Repository of arXiv:1711.00279v1, Nov. 1, 2017, pp. 1-15.

Luong, et al., "Stanford Neural Machine Translation Systems for Spoken Language Domains", In Proceedings of the 12th International Workshop on Spoken Language Translation, Dec. 3, 2015, pp. 76-79.

Papineni, et al., "BLEU: A Method for Automatic Evaluation of Machine Translation", In Proceedings of the 40th Annual Meeting on Association for Computational Linguistics, Jul. 6, 2002, pp. 311-318.

Pascanu, et al., "On the Difficulty of Training Recurrent Neural Networks", In Proceedings of the 30th International Conference on Machine Learning, vol. 28, May 26, 2013, pp. 1310-1318.

"International Search Report and Written Opinion Issued in PCT Application No. PCT/US2019/064801", Mailed Date: Mar. 16, 2020, 10 Pages.

Pingali, et al., "Sentence Extraction Based Single Document Summarization", In Workshop on Document Summarization IIIT/TR/2008/97 of International Institute of Information Technology, Mar. 19, 2005, 6 Pages.

Prakash, et al., "Neural Paraphrase Generation with Stacked Residual LSTM Networks", In Proceedings of the 26th International Conference on Computational Linguistics, Dec. 11, 2016, pp. 2923-2934.

Su, et al., "Variational Recurrent Neural Machine Translation", In Proceedings of The Thirty-Second AAAI Conference on Artificial Intelligence, Apr. 27, 2018, pp. 5488-5495.

Sutskever, et al., "Sequence to Sequence Learning with Neural Networks", In Proceedings of Advances in Neural Information Processing Systems, Dec. 8, 2014, pp. 1-9.

Xia, et al., "Deliberation Networks: Sequence Generation Beyond One-Pass Decoding", In Proceedings of Advances in Neural Information Processing Systems, Dec. 4, 2017, pp. 1-11.

"Office Action Issued in European Patent Application No. 19850741.0", Mailed Date: Feb. 10, 2023, 6 Pages.

Office Action Received for Chinese Application No. 201811585240.7, mailed on Jan. 4, 2024, 13 pages (English Translation Provided).

* cited by examiner

TEXT GENERATION WITH CUSTOMIZABLE STYLE

This application is a U.S. National Stage Filing under 35 U.S.C. 371 from International Application No. PCT/US2019/064801, filed Dec. 6, 2019 and published in English as WO 2020/139536 on Jul. 2, 2020 which claims the benefit of priority to Chinese Patent Application No. 201811585240.7, filed Dec. 24, 2018, each of which application is incorporated herein by reference in its entirety.

BACKGROUND

A Natural Language Processing (NLP) technology relates to interaction between a computer and a human language or natural language, in particular how a large number of natural language data are processed or analyzed. The NLP technology is applicable to a variety of fields, including machine translation, text summarization and paraphrasing, and the like. Text generation is the core technology of various NLP applications. However, the current text generation model does not support style customization.

SUMMARY

Various implementations of the present disclosure provide a solution for text generalization with customizable style. In some implementations, a first natural language text is converted by a text generation model into a second natural language text that at least partly reflects the meaning of the first natural language text and comprises a style distinguishable from the first natural language text, the text generation model comprising a modifiable parameter. In response to receiving a modification to the parameter, the first natural language text is converted by the text generation model into a third natural language text that at least partly reflects the meaning of the first natural language text and comprising a style distinguishable from both the first natural language text and the second natural language text.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference symbols refer to the same or similar elements.

DETAILED DESCRIPTION OF EMBODIMENTS

Principles of example embodiments disclosed herein will now be described with reference to various example embodiments illustrated in the drawings. It would be appreciated that description of those embodiments is merely to enable those skilled in the art to better understand and further implement example embodiments disclosed herein and is not intended for limiting the scope disclosed herein in any manner.

As used herein, the term "includes" and its variants are to be read as open-ended terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

Figure 1:
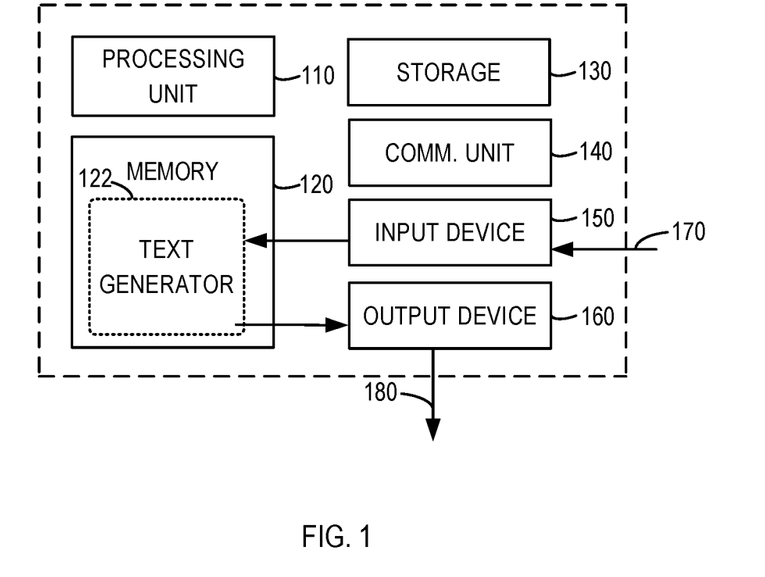
FIG. 1 illustrates a block diagram of a computer device in which implementations of the present disclosure can be carried out.

Basic principles and various example implementations of the present disclosure will now be described with reference to the drawings. FIG. 1 illustrates a block diagram of a computing device 100 in which implementations of the present disclosure can be carried out. It would be appreciated that the computing device 100 as shown in FIG. 1 is merely provided as an example, rather than constituting any limitation to the functionalities and scope of implementations as described in the present disclosure. As shown in FIG. 1, the computing device 100 includes a computing device 100 in the form of general computing device. Components of the computing device 100 can include, but are not limited to, one or more processors or processing units 110, a memory 120, a storage device 130, one or more communication units 140, one or more input devices 150, and one or more output devices 160.

In some implementations, the computing device 100 can be implemented as various user terminals or service terminals having a computing capability. The service terminal may be any server, large-scale computing device, and the like, as provided by various service providers. The user terminal, for example, may be any type of mobile terminal, fixed terminal or portable terminal, such as mobile telephone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, TV receiver, radio broadcast receiver, E-book device, gaming device or any combinations thereof, including accessories and peripherals of these devices or any combinations thereof. It would be appreciated that the computing device 100 can support any type of interface for a user (such as a "wearable" circuit).

The processing unit 110 can be any physical or virtual processor and can perform various processing based on programs stored in the memory 120. In a multi-processor system, multiple processing units execute computer-executable instructions in parallel to improve the parallel processing capacity of the computing device 100. The processing unit 110 can also be referred to as a central processing unit (CPU), microprocessor, controller or microcontroller.

The computing device 100 typically includes a plurality of computer storage media, which may be any available media accessible by the computing device 100, including, but not limited to, volatile and non-volatile media, and removable and non-removable media. The memory 120 can be a volatile memory (for example, a register, cache, Random Access Memory (RAM)), non-volatile memory (for example, a Read-Only Memory (ROM), Electrically Erasable Programmable Read-Only Memory (EEPROM), flash memory), or any combination thereof. The memory 120 can include a text generation module 122, and these program modules are configured to execute functionalities of various implementations as described herein. The text generation module 122 can be accessed and operated by the processing unit 110, so as to implement respective functionalities.

The storage device 130 can be any removable or non-removable medium, and can include machine-readable media which can be used for storing information and/or data and accessed in the computing device 100. The computing device 100 can further include additional removable/non-removable, volatile/non-volatile memory media. Although not shown in FIG. 1, a disk drive can be provided for reading and writing a removable and non-volatile disk and a disc drive can be provided for reading and writing a removable non-volatile disc. In these cases, each drive can be connected to the bus (not shown) via one or more data medium interfaces.

The communication unit 140 communicates with a further computing device via communication media. In addition, functionalities of components in the computing device 100 can be implemented by a single computing cluster or multiple computing machines connected communicatively for communication. Therefore, the computing device 100 can be operated in a networking environment using a logical link with one or more other servers, network personal computers (PCs) or another general network node.

The input device 150 can include one or more input devices, such as a mouse, keyboard, tracking ball, voice-input device, and the like. The output device 160 can include one or more output devices, such as a display, loudspeaker, printer and the like. As required, the computing device 100 can also communicate via the communication unit 140 with one or more external devices (not shown) such as a storage device, display device and the like, one or more devices that enable users to interact with the computing device 100, or any devices that enable the computing device 100 to communicate with one or more other computing devices (for example, a network card, modem, and the like). Such communication can be performed via an input/output (I/O) interface (not shown).

In some implementations, besides integrated on a single device, some or all components in the computing device 100 can be provided in the form of cloud computing architecture. In the cloud computing architecture, these components can be arranged remotely, and can operate together to implement the functionalities described herein. In some implementations, the cloud computing provides computing, software, data access and storage services, without a necessity of letting a terminal user know the physical location or configuration of the system or hardware that provides these services. In various implementations, the cloud computing provides services via a wide area network (for example, Internet) using an appropriate protocol. For example, a cloud computing provider provides applications via a wide area network, and they are accessible via a web browser or any other computing component. Software or components and respective data of the cloud computing architecture can be stored on a server at a remote location.

Computing resources in a cloud computing environment can be merged at a remote data center location or can be dispersed. Cloud computing infrastructures can provide services through a shared data center even though they are presented as a single access point for the user. Hence, the cloud computing architecture can be used to provide components and functionalities as described herein from the service provider at the remote location. Alternatively, they may be provided from regular servers, or they may be mounted on a client device directly or in other manners.

The computing device 100 can be used to implement a method of converting a natural language input or text in one style into a nature language or text in another style (which is also referred to as stylization). In a text, "style" refers to text features and/or language features for embodying how ideas or information is presented, such as length, vocabulary or glossary, writing style, and the like. Different styles can be distinguished from one another. More specifically, the style can include word choice, sentence structures, paragraph structures, and the like.

When stylizing a text, the computing device 100 can receive a text (or a natural language sentence) 170 via the input device 150. The text generalization module 122 can process the text 170 and generate, based on the text 170, a text in another style which at least reflects, embodies, or indicates information contained or conveyed by the text 170. The text can be fed to the output device 160 and provided to a user as an output 180. For example, the text can be displayed on a display for the user.

Figure 2:
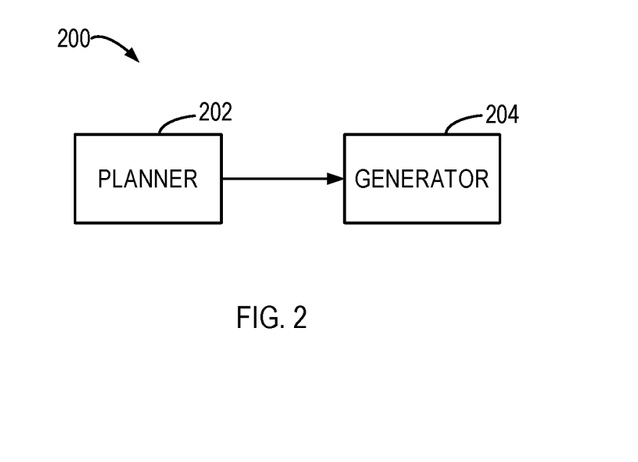
FIG. 2 illustrates a schematic diagram of text stylization architecture according to some implementations of the present disclosure.

Example implementations of the present disclosure will be described in detail with reference to FIGS. 2-5. FIG. 2 illustrates a schematic diagram of text stylization architecture 200 according to some implementations of the present disclosure. It would be appreciated that FIG. 2 is merely provided as an example, without any intention to limit the scope of the present disclosure. Without departing from the spirits and scope of the present disclosure, one or more modules in the text stylization architecture 200 may be combined into one module, one or more modules may be added to the text stylization architecture 200, and/or one or more modules in the text stylization architecture 200 may be replaced, or the like.

In some implementations, a text or natural language input can be provided to a planner 202. The planner 202 can convert the text into a text in another style. The planner 202 can determine and output, based on a natural language text, a planning representation that indicates the style of the text generated finally, for example, how the text should look like (e.g., length, wording and the like). The generator 204 can generate, based on the natural language text and the planning representation output by the planner 202, a text having the style indicated by the planning representation, and output the text with the style. The generator 204 can be a sequence to sequence model, for example, an encoder-encoder model.

In some implementations, the planner 202 is customizable by a user. For example, the planner 202 can include user customizable parameters such that the user can modify the customizable parameters to change the planning representation output by the planner 202, and further modify the style output by the generator 204.

Figure 3:
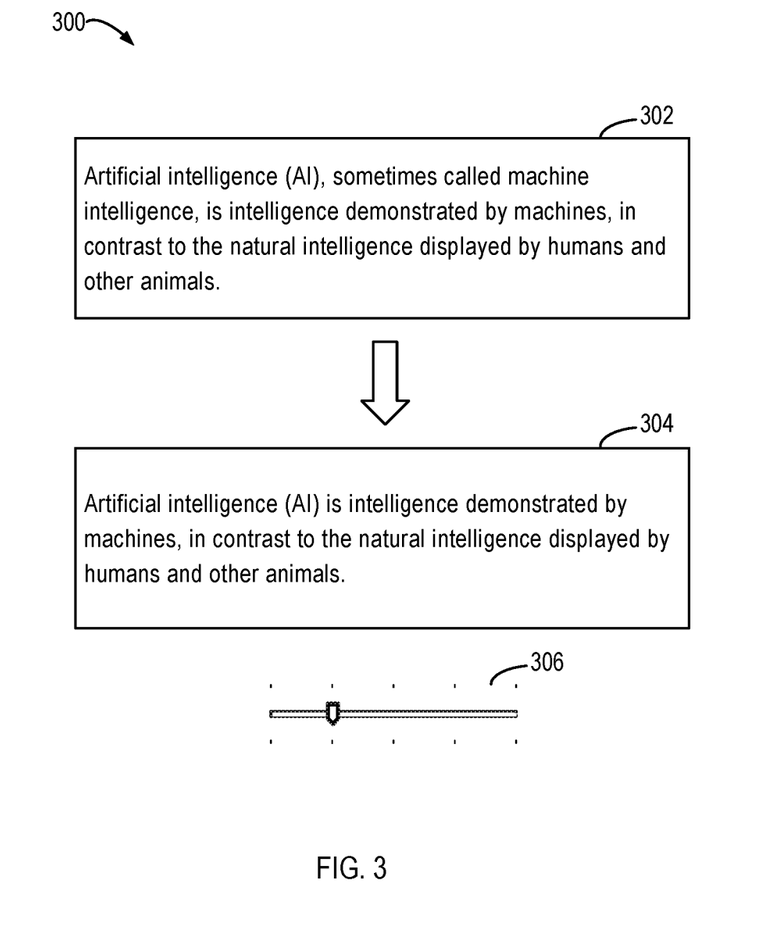
FIG. 3 illustrates a schematic diagram of an interface for text stylization according to some implementations of the present disclosure.

FIG. 3 illustrates a schematic diagram of an interface 300 for text stylization according to some implementations of the present disclosure. In the example, the customized style refers to a length of a text. As shown in FIG. 3, the natural language text 302 is provided to the planner 202 as an input, and the generator 204 outputs a natural language text 304 in the customized style, which reflects or embodies the gist or main meaning of the natural language text 304. In addition, a graphical interface element 306 illustrates an example of a customizable parameter. In the example, the customizable parameter includes five customizable levels, and FIG. 3 shows that the customizable parameter is at a second level.

Figure 4:
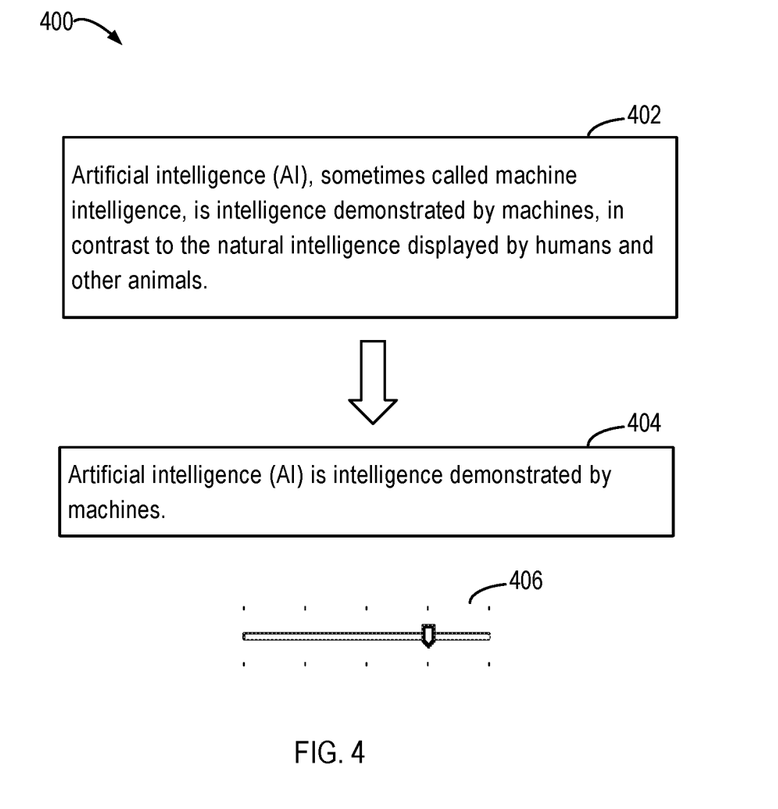
FIG. 4 illustrates a schematic diagram of an interface for text stylization according to some implementations of the present disclosure.

FIG. 4 illustrates a schematic diagram of an interface 400 for text stylization according to some implementations of the present disclosure. FIG. 4 corresponds to FIG. 3, but shows an example with a different customizable level. As shown in FIG. 4, a natural language text 402 is provided to the planner 202 as an input, and the generator 204 outputs a natural language text 404 with the customized style, which embodies the meaning of the natural language text 402. Moreover, the graphical interface element 406 illustrates an example of a customizable parameter, and FIG. 4 illustrates that the customizable parameter is at a fourth level. As seen above, the output at the fourth level includes a natural language text with a smaller length.

Figure 5:
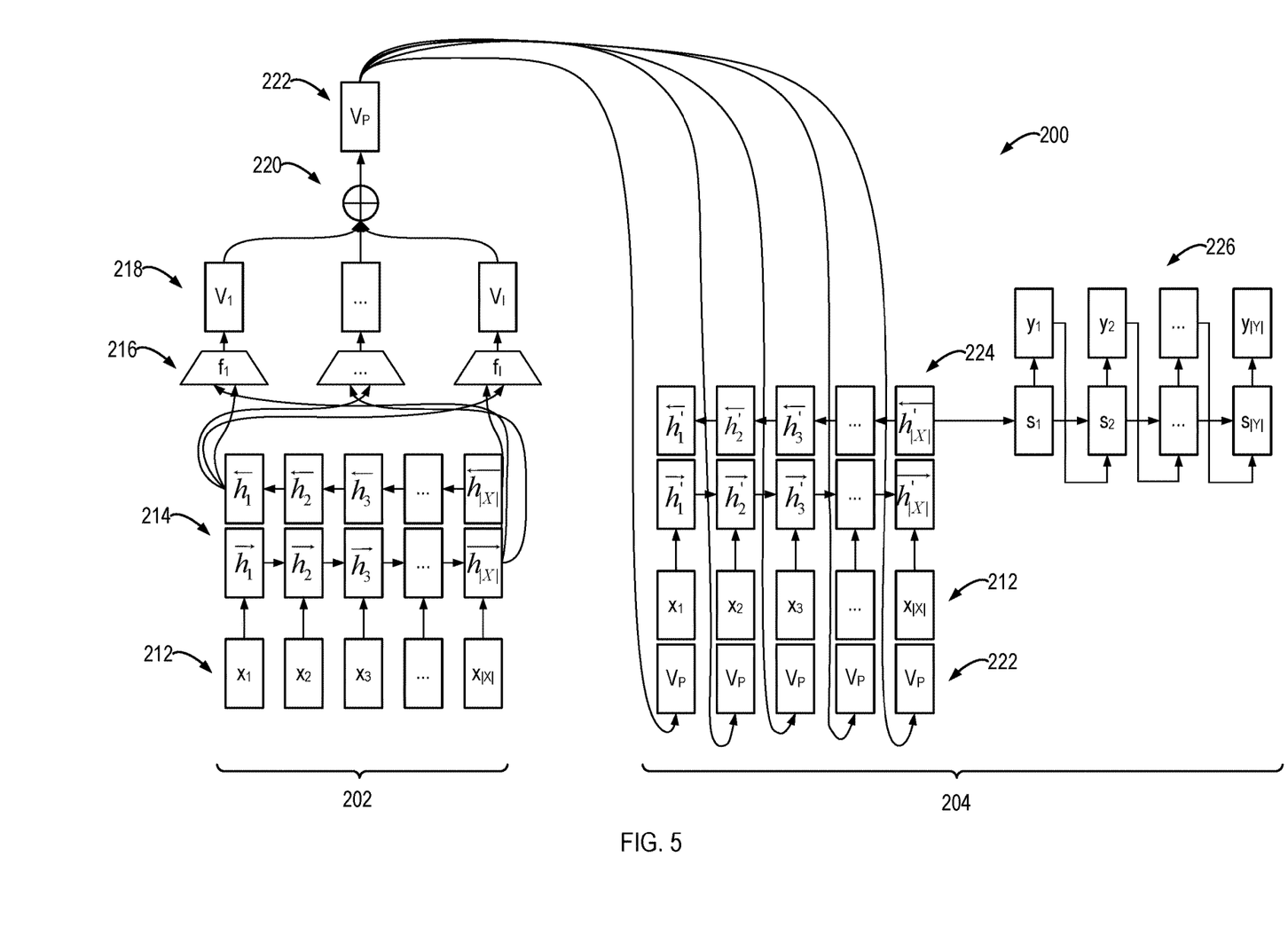
FIG. 5 illustrates a schematic diagram of a model for text stylization according to some implementations of the present disclosure.

FIG. 5 illustrates a schematic diagram of the text stylization architecture 200 according to some implementations of the present disclosure. As shown in FIG. 5, the planner 202 receives an input sequence 212 represented as X ($x_1$, $x_2$, ..., $x_{|X|}$), wherein the input sequence 212 denotes an embedded representation or a vector representation of a natural language text $w_t$ (where t=1 ... |X|), and |X| represents length of the input sequence 212. It would be appreciated that the embedded representation of the natural language text can be determined using any method currently known or to be developed in the future. The planner 202 can determine and output a planned representation or predicted vector $V_P(X)=[V_1; ...; V_I]$, where each sub-vector $V_i$ denotes a representation of a specific characteristic of the input sequence 212, such as a length, wording or the like, ";" denotes concatenation of sub-vectors, and |X| denotes the length of the input sequence X.

As shown in FIG. 5, the input sequence 212 can be provided to a bidirectional recurrent neural network (RNN) model 214, for example, a bidirectional Long Short-Term Memory (LSTM) model or bidirectional Gate Recurrent Unit (GRU) model. It would be appreciated that any other appropriate neural network module can be used to replace the bidirectional neural network model.

In some implementations, the bidirectional recurrent neural network model 214 can decode the input sequence 212 as a hidden state sequence ($h_1, h_2, ..., h_{|X|}$), where $h_t=[\overleftarrow{h_t}; \overrightarrow{h_t}]$ denotes concatenation of a hidden state $\overrightarrow{h_t}$ LSTM($x_t, \overrightarrow{h_{t-1}}$) of a forward neural network and a hidden state $\overleftarrow{h_t}$=LSTM($x_t, \overleftarrow{h_{t+1}}$) of a backward neural network of a word $w_t$, which can also be represented as $v_X=[\overleftarrow{h_t}; \overrightarrow{h_{|X|}}]$.

As shown in FIG. 5, the hidden state sequence is provided to each planning function 216 as an input. A planning function 216 is provided for calculating a planning sub-vector 218 based on the hidden state sequence, which can be represented as $V_i=f_i(v_X)=f_i([\overleftarrow{h_1}; \overrightarrow{h_{|X|}}])$, where $f_i(\bullet)$ denotes a planning function for generating each planning sub-vector 218 based on the hidden state sequence. In some implementations, $f_i(\bullet)$ can be implemented via any appropriate differentiable function.

The planning function $f_i(*)$ can include a customizable parameter for providing an interface for customizing a style of a natural language text. A user can alter the customizable parameter of the planning function to customize a style of a text to be generated, for example the customized solution as shown in FIGS. 3-4.

In some implementations, a solution on length planning can be implemented, in which a planner 202 predicts the length of the output sequence. For example, a real number $V_{Len} \in \mathfrak{R}^1$ denotes a length planning vector (for example, corresponding to $V_1$ as shown in FIG. 5), and defines a corresponding planning function $f_{Len}(\bullet)=W_{Len} \cdot v_X$, where $W_{Len} \in \mathfrak{R}^{1 \times 2d}$ denotes a parameter vector which is a model training parameter. For example, in the planning function, a customizable proportionality coefficient can be defined to customize length of a text to be output. In the training process, for a pair of input and output ⟨X, Y⟩, the groundtruth of the length planning vector $V_{Len}$ can be defined as |Y|. For example, a normalized vector |Y|/|X|−1 can be used for normalization.

In some implementations, a solution on vocabulary planning can be implemented, in which the planner 202 predicts a set of words used in an output sequence. A vector $V_{Vocab} \in \mathfrak{R}^N$ can be used to denote a vocabulary planning vector (for example, corresponding to $V_1$ as shown in FIG. 5). In some implementations, the planning function can be defined as $f_{Vocab}(\bullet)=\text{sigmoid}(W_{Vocab} \cdot v_X)$, where $W_{Vocab} \in \mathfrak{R}^{N \times 2d}$ denotes a parameter matrix, N denotes a vocabulary size, and sigmoid(•) denotes the sigmoid function. It would be appreciated that any other appropriate function can be used to replace the sigmoid function.

The vocabulary planning function can include a customizable parameter. For example, vector values of some vocabularies in the vocabulary planning vectors are defined as zero, such that the vocabularies will not appear in the output sequence. For example, several options can be provided, and one of them may be to select a basic vocabulary, in which vector values of the vocabulary planning vectors corresponding to advanced vocabulary can be set to zero.

In some implementations, at the combiner 220, a plurality of planning sub-vectors 218 can be combined to obtain a planning vector 222. For example, the planning sub-vectors $V_{Len}$ and $V_{Vocab}$ are combined to obtain a planning vector $V_P(X)$ [$V_{Len}$; $V_{Vocab}$] of the input sequence 212.

As shown in FIG. 5, the generator 204 can receive the input sequence 212 and the planning vector 222 as inputs. In some implementations, the encoder-decoder architecture can be used to implement the generator 204. It would be appreciated that any other appropriate architecture can be used to implement the generator 204. For example, the input sequence (embedded vector) 212 and its planning vector 222 can be concatenated to form a modified embedded vector ($x'_1, ..., x'_{|X|}$), which is provided to the encoder 224 as an input. The encoder 224 can generate, based on the modified embedded vector ($x'_1, ..., x'_{|X|}$), a hidden state sequence ($h'_1, h'_2, ..., h'_{|X|}$), where $h'_t=[\overleftarrow{h'_t}; \overrightarrow{h'_t}]$ denotes concatenation of a forward hidden state $\overrightarrow{h'_t}$=LSTM($x'_t, \overrightarrow{h'_{t-1}}$) and a backward hidden state $\overleftarrow{h'_t}$=LSTM($x'_t, \overleftarrow{h'_{t+1}}$). It would be appreciated that, although LSTM is provided herein as an example for describing the encoder 224, any other appropriate neural network can also be used to implement the encoder 224.

As shown in FIG. 5, a decoder 226 generates, based on an encoder sequence generated by the encoder 224, a target sequence ($y_1, y_2, \ldots, y_{|Y|}$). The decoder 226 can be implemented by LSTM, as shown in FIG. 5. It would be appreciated that the decoder 226 can also be implemented by any other appropriate neural network.

A probability of a word $y_t$ at time t can be represented as $p(y_t|y_{<t}, h')=g(t_{t-1}, s_t, c_t)$, where $s_t$ denotes a $t^{th}$ hidden state of the decoder 226, $y_{t-1}$ denotes a word generated at time step t−1, and $c_t$ denotes a context vector that can be computed based on an attention mechanism. The context vector $c_t$ can be calculated through equations (1) and (2):

$$c_t = \sum_{j=1}^{|X|} \alpha_{tj} h'_j \quad (1)$$

$$\alpha_{tj} = \frac{\exp a(s_{t-1}, h'_j)}{\sum_{k=1}^{|X|} \exp a(s_{t-1}, h'_k)} \quad (2)$$

where a denotes a feed-forward neural network.

In some implementations, the text stylization architecture can be trained, as shown in FIG. 5, through a plurality of pairs of inputs and outputs. For examples, for M pairs of inputs and outputs $\{\langle X, Y \rangle\}_{i=1}^{M}$, the text style and the model as shown in FIG. 5 can be trained by minimizing a loss function. In some implementations, the loss function can be a loss function as shown through equation (3):

$$l = -\frac{1}{M} \sum_{\langle X,Y \rangle} \sum_t \log p(y_t|y_{<t}, X) + \sum_{i=1}^{l} w_i \times l_i \quad (3)$$

In the loss function (3), the first item is a common loss function of a sequence to sequence model, and the second item is provided for optimizing different planning functions, where the parameter $w_i$ denotes the weight of the loss function $l_i$ of each planning module for controlling its significance.

In some implementations, the loss function of the length planning module can be expressed as equation (4):

$$l_{Len} = \frac{1}{M} \sum_{\langle X,Y \rangle} MSE(V_{Len}, |Y|/|X|-1) \quad (4)$$

where MSE denotes an equal error.

In some implementations, the loss function of the vocabulary planning module can be expressed as equation (5):

$$l_{Vocab} = \frac{1}{M} \sum_{\langle X,Y \rangle} H(OneHot(Y), V_{Vocab}) \quad (5)$$

where H(y, p) denotes a binary cross entropy function and can be calculated through equation (6) H(y, p)=(y*log(p)+(1−y)log(1−p)). In addition, OneHot(Y) denotes a one-hot representation of the ground-truth Y.

Due to planning through a planner 202, the text generation according to implementations of the present disclosure can show an improved performance and generate an optimized text output.

Figure 6:
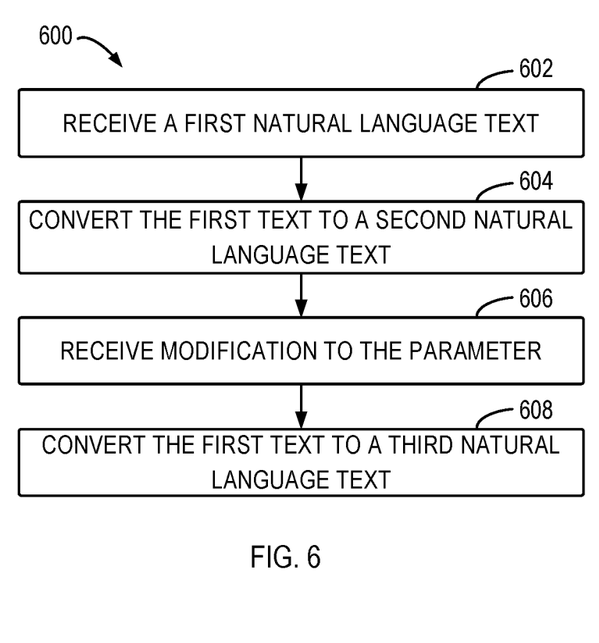
FIG. 6 illustrates a flowchart of a text stylization method according to some implementations of the present disclosure.

FIG. 6 illustrates a flowchart of a method 600 of text stylization according to some implementations of the present disclosure. The method 600 can be implemented by the text generation module 122 as shown in FIG. 1 or the text stylization architecture 200 as shown in FIG. 2 or 5. However, it would be appreciated that the method 600 can be implemented using any other appropriate module or architecture.

At 602, a first natural language text is received. The first natural language text can be a natural language text provided to the planner 202.

At 604, the first natural language text is converted into a second natural language text by a text generation module. The second natural language text reflects, shows, or includes at least partly the meaning of the first natural language text and comprises a style distinguishable from the first natural language text, and the text generation module includes a modifiable parameter.

In some implementations, a first feature vector can be extracted from the first natural language text. The first feature vector is converted by a planning function with a modifiable parameter into a second feature vector which is defined by a first parameter value of the modifiable parameter and represents the style distinguishable from the first natural language text. Then, the second natural language text can be generated based on the second feature vector. In some implementations, the first feature vector is extracted from the first natural language text via a bidirectional recurrent neural network. For example, the planner 202 as shown in FIG. 2 or 5 can extract a feature vector based on a natural language text, and generate a feature vector 222 based on the extracted feature vector.

In some implementations, the second feature vector includes at least one of a first sub-vector which represents the length of the second natural language text defined by a first parameter value, and a second sub-vector which represents the vocabulary of the second natural language text defined by the first parameter value. For example, the first sub-vector or the second sub-vector can be one of the planning sub-vectors 218 as shown in FIG. 5.

In some implementations, the second natural language text is generated based on the first natural language text and the second feature vector. For example, the generator 204 as shown in FIG. 5 can generate a natural language text based on the natural language text 212 and the feature vector 222. Specifically, in the generator as shown in FIG. 5, the vector representation 212 of the first natural language text is obtained, the vector representation 212 and the second feature vector 222 of the first natural language are concatenated to obtain a concatenated feature vector, and the second natural language text is generated based on the concatenated feature vector.

In some implementations, the second natural language text is generated via an encoder-decoder based on the second feature vector. For example, the encoder-decoder can be the encoder-decoder architecture as shown in FIG. 5.

At 606, a modification to the parameter is received. A user can modify the customizable parameter, so as to customize the customizable parameter.

At 608, the first natural language text is converted by the text generation model into a third natural language text which at least partly reflects the meaning of the first natural language text and has a style distinguishable from both the first natural language text and the second natural language text.

In some implementations, the first feature vector is converted, via a planning function with a modifiable parameter, into a third feature vector which is defined by the second parameter value with a modifiable parameter and represents a style distinguishable from the first natural language text and the second natural language text. Then, the third natural language text is generated based on the third feature vector. For example, FIGS. 3 and 4 illustrate an output in different styles, respectively.

In some implementations, the third feature vector includes at least one of a third sub-vector which represents the length of the third natural language text defined by a second parameter value, and a fourth sub-vector which represents the vocabulary of the third natural language text defined by the second parameter value.

Some example implementations of the present disclosure will be given below.

In a first aspect, there is provided a computer-implemented method. The method comprises receiving a first natural language text; converting the first natural language text into a second natural language text by a text generation model, the second natural language text at least partly reflecting a meaning of the first natural language text and comprising a style distinguishable from the first natural language text, the text generation model comprising a modifiable parameter; and in response to receiving a modification to the parameter, converting the first natural language text into a third natural language text by the text generation model, the third language text at least partly reflecting the meaning of the first natural language text and comprising a style distinguishable from both the first natural language text and the second natural language text.

In some implementations, converting the first natural language text into the second natural language text comprises: extracting a first feature vector from the first natural language text; converting the first feature vector into a second feature vector by a planning function with the modifiable parameter, the second feature vector being defined by a first parameter value of the modifiable parameter and representing a style distinguishable from the first natural language text; and generating, based on the second feature vector, the second natural language text.

In some implementations, converting the first natural language text into a third natural language text comprises: converting the first feature vector into a third feature vector by a planning function with the modifiable parameter, the third feature vector being defined by a second parameter value of the modifiable parameter and representing a style distinguishable from both the first natural language text and the second natural language text; and generating, based on the third feature vector, the third natural language text.

In some implementations, the second feature vector comprises at least one of a first feature sub-vector that represents a length of the second natural language text defined by the first parameter value, and a second sub-vector that represents a vocabulary of the second natural language text defined by the first parameter value.

In some implementations, generating, based on the second feature vector, the second natural language text comprises: obtaining a vector representation of the first natural language text; concatenating a vector representation of the first natural language text and the second feature vector to obtain a concatenated feature vector; and generating, based on the concatenated feature vector, the second natural language text.

In some implementations, extracting the first feature vector from the first natural language text comprises: extracting the first feature vector from the first natural language text by a bidirectional recurrent neural network.

In some implementations, generating, based on the second feature vector, the second natural language text comprises: generating, based on the second feature vector, the second natural language text by an encoder-decoder.

In some implementations, the third feature vector comprises at least one of a third sub-vector that represents a length of the third natural language text defined by the second parameter value, and a fourth sub-vector that represents a vocabulary of the third natural language text defined by the second parameter value.

In a second aspect, there is provided a device. The device comprises a processing unit; and a memory coupled to the processing unit and having instructions stored thereon, the instructions, when executed by the processing unit, causing the device to perform acts comprising: receiving a first natural language text; converting the first natural language text into a second natural language text by a text generation model, the second natural language text at least partly reflecting a meaning of the first natural language text and comprising a style distinguishable from the first natural language text, the text generation model comprising a modifiable parameter; and in response to receiving a modification to the parameter, converting the first natural language text into a third natural language text by the text generation model, the third language text at least partly reflecting the meaning of the first natural language text and comprising a style distinguishable from both the first natural language text and the second natural language text.

In some implementations, converting the first natural language text into the second natural language text comprises: extracting a first feature vector from the first natural language text; converting the first feature vector into a second feature vector by a planning function with the modifiable parameter, the second feature vector being defined by a first parameter value of the modifiable parameter and representing a style distinguishable from the first natural language text; and generating, based on the second feature vector, the second natural language text.

In some implementations, converting the first natural language text into a third natural language text comprises: converting the first feature vector into a third feature vector by a planning function with the modifiable parameter, the third feature vector being defined by a second parameter value of the modifiable parameter and representing a style distinguishable from both the first natural language text and the second natural language text; and generating, based on the third feature vector, the third natural language text.

In some implementations, the second feature vector comprises at least one of a first feature sub-vector that represents a length of the second natural language text defined by the first parameter value, and a second sub-vector that represents a vocabulary of the second natural language text defined by the first parameter value.

In some implementations, generating, based on the second feature vector, the second natural language text comprises: obtaining a vector representation of the first natural language text; concatenating a vector representation of the first natural language text and the second feature vector to obtain a concatenated feature vector; and generating, based on the concatenated feature vector, the second natural language text.

In some implementations, extracting the first feature vector from the first natural language text comprises: extracting the first feature vector from the first natural language text by a bidirectional recurrent neural network.

In some implementations, generating, based on the second feature vector, the second natural language text comprises:

generating, based on the second feature vector, the second natural language text by an encoder-decoder.

In some implementations, the third feature vector comprises at least one of a third sub-vector that represents length of the third natural language text defined by the second parameter value, and a fourth sub-vector that represents a vocabulary of the third natural language text defined by the second parameter value.

In a third aspect, the present disclosure provides a computer program product, which is tangibly stored in a non-transient computer storage medium and includes machine executable instructions, and the machine executable instructions, when executed by a device, cause the device to execute the method in the first aspect of the present disclosure.

In a fourth aspect, the present disclosure provides a computer readable medium, which has computer executable instructions stored thereon, and the computer executable instructions, when executed by a device, cause the device to execute the method in the first aspect of the present disclosure.

The functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the present disclosure may be written in any combination of one or more programming languages. These program codes may be provided to a processor or controller of a general purpose computer, special purpose computer, or other programmable data processing apparatus, such that the program code, when executed by the processor or controller, causes the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method comprising:
receiving a first natural language text;
converting the first natural language text into a second natural language text by a text generation model, the second natural language text at least partly reflecting a meaning of the first natural language text and comprising a style distinguishable from the first natural language text, the text generation model comprising a modifiable parameter, wherein the modifiable parameter is applied to the first natural language text when converting the first natural language text into the second natural language text and converting the first natural language text into the second natural language text comprises:
  extracting a first feature vector from the first natural language text;
  converting the first feature vector into a second feature vector by a planning function with the modifiable parameter by:
    applying the first feature vector to a neural network to provide a state sequence; and
    providing the state sequence to the planning function to generate the second feature vector, wherein the second feature vector is defined by a first parameter value of the modifiable parameter and represents a style distinguishable from the first natural language text; and
generating, based on the second feature vector, the second natural language text;
receiving an update to the modifiable parameter via a graphical user interface element that adjusts an output of the conversion; and
in response to receiving a modification to the parameter, converting the first natural language text into a third natural language text by the text generation model with the updated modifiable parameter, the third language text at least partly reflecting the meaning of the first natural language text and comprising a style distinguishable from both the first natural language text and the second natural language text.

2. The method of claim 1, wherein converting the first natural language text into a third natural language text comprises:
converting the first feature vector into a third feature vector by the planning function with the modifiable parameter, the third feature vector being defined by a second parameter value of the modifiable parameter and representing a style distinguishable from both the first natural language text and the second natural language text; and generating, based on the third feature vector, the third natural language text.

3. The method of claim 2, wherein the third feature vector comprises at least one of a third sub-vector that represents a length of the third natural language text defined by the second parameter value, and a fourth sub-vector that represents a vocabulary of the third natural language text defined by the second parameter value.

4. The method of claim 1, wherein the second feature vector comprises at least one of a first feature sub-vector that represents a length of the second natural language text defined by the first parameter value, and a second sub-vector that represents a vocabulary of the second natural language text defined by the first parameter value.

5. The method of claim 1, wherein generating, based on the second feature vector, the second natural language text comprises:
obtaining a vector representation of the first natural language text;
concatenating a vector representation of the first natural language text and the second feature vector to obtain a concatenated feature vector; and
generating, based on the concatenated feature vector, the second natural language text.

6. The method of claim 1, wherein extracting the first feature vector from the first natural language text comprises:
extracting the first feature vector from the first natural language text by a bidirectional recurrent neural network.

7. The method of claim 1, wherein generating, based on the second feature vector, the second natural language text comprises:
generating, based on the second feature vector, the second natural language text by an encoder-decoder.

8. A device, comprising:
a processing unit; and
a memory coupled to the processing unit and having instructions stored thereon, the instructions, when executed by the processing unit, causing the device to perform acts comprising:
receiving a first natural language text;
converting the first natural language text into a second natural language text by a text generation model, the second natural language text at least partly reflecting a meaning of the first natural language text and comprising a style distinguishable from the first natural language text, the text generation model comprising a modifiable parameter, wherein the modifiable parameter is applied to the first natural language text when converting the first natural language text into the second natural language text and converting the first natural language text into the second natural language text comprises:
extracting a first feature vector from the first natural language text;
converting the first feature vector into a second feature vector by a planning function with the modifiable parameter by:
applying the first feature vector to a neural network to provide a state sequence; and
providing the state sequence to the planning function to generate the second feature vector,
wherein the second feature vector is defined by a first parameter value of the modifiable parameter and represents a style distinguishable from the first natural language text; and
generating, based on the second feature vector, the second natural language text;
receiving an update to the modifiable parameter via a graphical user interface element that adjusts an output of the conversion; and
in response to receiving a modification to the parameter, converting the first natural language text into a third natural language text by the text generation model with the updated modifiable parameter, the third language text at least partly reflecting the meaning of the first natural language text and comprising a style distinguishable from both the first natural language text and the second natural language text.

9. The device of claim 8, wherein converting the first natural language text into a third natural language text comprises:
converting the first feature vector into a third feature vector by a planning function with the modifiable parameter, the third feature vector being defined by a second parameter value of the modifiable parameter and representing a style distinguishable from both the first natural language text and the second natural language text; and
generating, based on the third feature vector, the third natural language text.

10. The device of claim 9, wherein the third feature vector comprises at least one of a third sub-vector that represents length of the third natural language text defined by the second parameter value, and a fourth sub-vector that represents a vocabulary of the third natural language text defined by the second parameter value.

11. The device of claim 8, wherein the second feature vector comprises at least one of a first feature sub-vector that represents a length of the second natural language text defined by the first parameter value, and a second sub-vector that represents a vocabulary of the second natural language text defined by the first parameter value.

12. The device of claim 8, wherein generating, based on the second feature vector, the second natural language text comprises:
obtaining a vector representation of the first natural language text;
concatenating a vector representation of the first natural language text and the second feature vector to obtain a concatenated feature vector; and
generating, based on the concatenated feature vector, the second natural language text.

13. The device of claim 8, wherein extracting the first feature vector from the first natural language text comprises extracting the first feature vector from the first natural language text by a bidirectional recurrent neural network; and
wherein generating, based on the second feature vector, the second natural language text comprises generating, based on the second feature vector, the second natural language text by an encoder-decoder.

* * * * *